United States Patent [19]

Mitchell

[11] Patent Number: 5,015,004
[45] Date of Patent: May 14, 1991

[54] ELEVATING, REVERSIBLE SELF-STEERING SUSPENSION SYSTEM

[75] Inventor: James L. Mitchell, Springfield, Mo.

[73] Assignee: Ridewell Corporation, Springfield, Mo.

[21] Appl. No.: 458,556

[22] Filed: Dec. 28, 1989

[51] Int. Cl.⁵ .............................................. B62D 61/12
[52] U.S. Cl. ..................................... 280/81.6; 280/704
[58] Field of Search ..................... 280/81.6, 704, 81.1, 280/86, 711, 713

[56] References Cited

U.S. PATENT DOCUMENTS

| | | | |
|---|---|---|---|
| 4,770,430 | 9/1988 | Lange | 280/81.6 |
| 4,881,747 | 11/1989 | Raidel | 280/81.6 |

Primary Examiner—Kenneth R. Rice
Attorney, Agent, or Firm—Rogers, Howell & Haferkamp

[57] ABSTRACT

An elevating, reversible self-steering suspension system incorporates upper and lower torque rods pivotally connected between a hanger assembly and an axle seat assembly. The upper torque rod of the parallelogram linkage is pivotally connected at one end to the axle seat assembly, and is pivotally connected at its opposite end to a pivot lever that, in turn, is pivotally connected to the hanger assembly. An end of the pivot lever opposite its pivot connection to the hanger assembly is connected to a selectively extended and retracted piston cylinder assembly. By extending the piston rod from the piston and cylinder assembly, the pivot lever is rotated relative to the hanger assembly, and the upper torque rod connecting the pivot lever to the axle seat causes the axle seat to be displaced. The displacement of the axle seat adjusts the orientation of a vehicle axle supported by the axle seat to a negative caster. By retracting the piston rod of the piston and cylinder assembly into the cylinder of the assembly, the pivot lever is again pivoted relative to the hanger assembly. The pivoting of the pivot lever causes the upper torque rod connecting the pivot lever to the axle seat to adjust the orientation of the axle seat, and adjust the pitch of the vehicle axle supported by the axle seat to a positive caster.

20 Claims, 3 Drawing Sheets

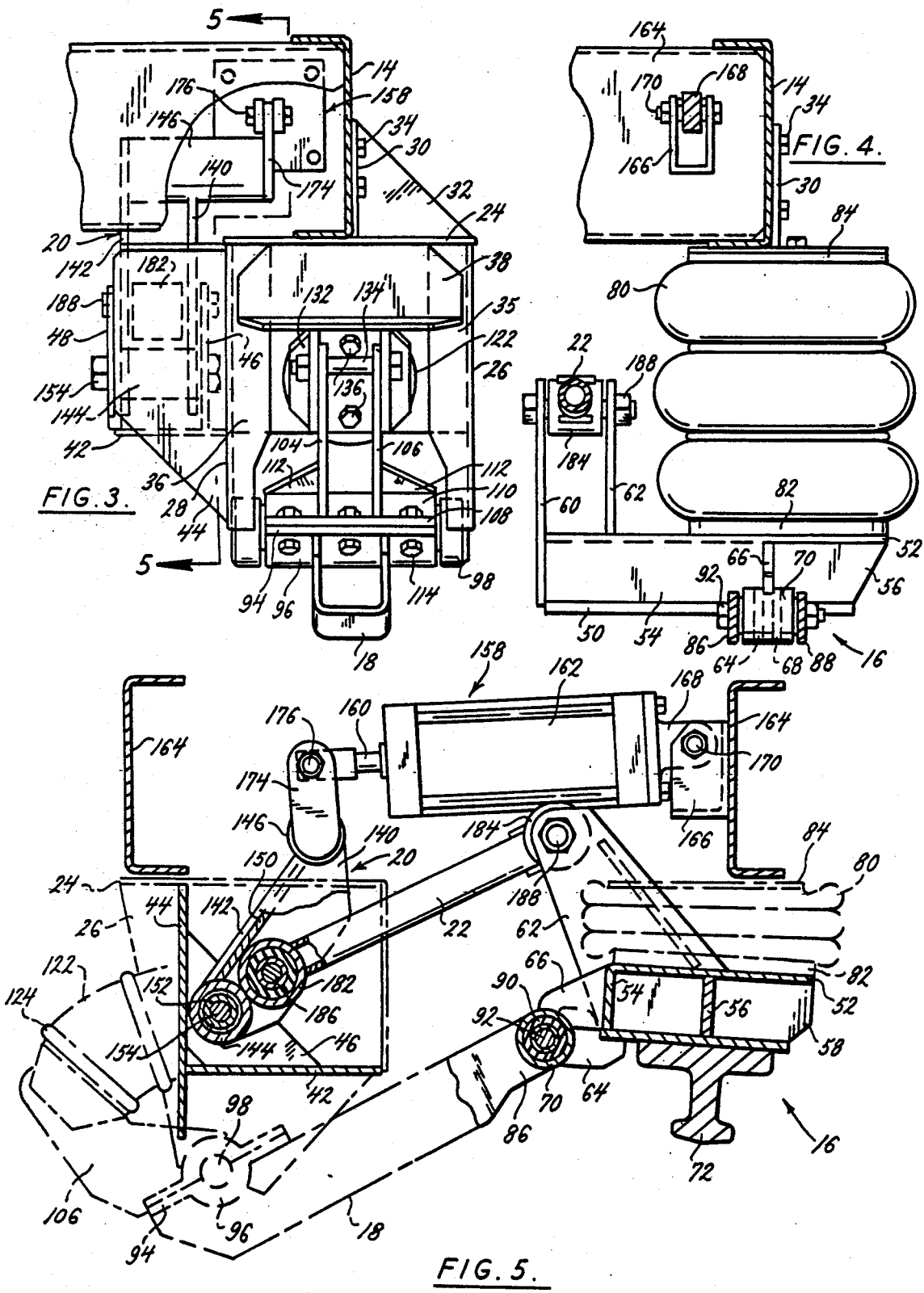

ELEVATING, REVERSIBLE SELF-STEERING SUSPENSION SYSTEM

BACKGROUND OF THE INVENTION:

(1) Field of the Invention

The present invention relates to an air ride suspension system for vehicles that can selectively raise and lower a vehicle axle supported by the suspension system relative to the vehicle, and can automatically adjust the pitch of the supported axle. In particular, the vehicle suspension system is automatically controlled to vary the pitch of a vehicle axle supported by the system between a forward and rearward caster, and is also selectively controlled by a vehicle driver to both raise and lower the vehicle axle relative to the vehicle.

(2) Description of the Related Art

Suspension systems of the type provided by the present invention are commonly employed in supporting a trailing axle or pusher axle of a vehicle. In conventional trailing or pusher axles, it is known that if the axle is installed with the proper pitch or caster, the drag exerted on the wheels supported by the axle will cause the wheels to steer automatically and follow the forward vehicle wheels in response to steering of the vehicle.

It is also known in the suspension system art to assemble suspension systems in the form of a parallelogram linkage assembly. Such parallelogram suspension systems are constructed as a parallelogram arrangement of torque rods connected between a hanger assembly and an axle seat. These systems commonly are comprised of a lower torque rod pivotally connected between the hanger and axle seat, and an upper torque rod pivotally connected between the hanger and axle seat. The parallelogram arrangement of the torque rods maintains the axle seat and the vehicle axle supported by the axle seat at a substantially constant pitch for all verticle displacements of the axle seat relative to the vehicle chassis.

Parallelogram linkage assemblies are also known which selectively elevate the axle seat relative to the vehicle chassis when the vehicle is supporting a reduced load. It is common for a selectively actuated air spring to be positioned between the lower torque rod and the hanger of the parallelogram system which selectively rotates the lower torque rod relative to the hanger to raise and lower the axle seat relative to the vehicle chassis.

Prior art vehicle suspension systems are known which combine a parallelogram arrangement that can selectively raise and lower a vehicle axle with the automatically controlled variable pitch axle. U.S. Pat. No. 4,770,430 to Lange discloses such a vehicle suspension system. A disadvantage of this suspension system and others of its kind is that one of the torque rods of the parallelogram linkage consists of a piston and cylinder assembly. The piston and cylinder assembly is used to vary the effective length of the torque rod, and thereby vary the pitch of the vehicle axle supported by the axle seat. However, the piston and cylinder assembly is not as rigid as the torque rod which it replaces. There are substantial forces exerted on an axle seat that has been lowered to an operative position to support some of the vehicle load. These forces will cause some fluctuation of the relative positions of the piston and cylinder of the variable length torque rod. The fluctuation in the relative positions of the piston and cylinder causes a corresponding fluctuation of the pitch of the axle supported by the axle seat. Because the difference in angular orientation of a vehicle axle adjusted between its forward and rearward pitch positions is very small, any fluctuation in the axle pitch could be effective to substantially negate the self steering effect obtained by setting the axle at a forward or rearward pitch.

It is an object of the present invention to overcome the aforesaid drawbacks of conventional parallelogram suspension systems by providing a parallelogram suspension system with an adjustable axle pitch that is more capable of resisting fluctuations of the axle pitch due to forces exerted on the vehicle axle than prior art systems. It is a further object of the present invention to provide a parallelogram suspension system that is selectively raised and lowered, and automatically adjusts the pitch of a vehicle axle supported by an axle seat of the system, where a piston and cylinder assembly is employed to vary the effective length of one of the torque beams of the system but the piston and cylinder assembly is not a part of the variable length torque beam.

SUMMARY OF THE INVENTION

The overall suspension system of the present invention is comprised of a pair of identical parallelogram assemblies, each assembly being positioned on an opposite side of the vehicle chassis. On each side of the vehicle chassis, a hanger is suspended downward from a chassis side rail. A lower torque rod is pivotally connected between the hanger and an axle seat. An air spring lever is connected to the lower torque rod and extends from the end of the lower torque rod that is pivotally connected to the hanger. A selectively expanded and retracted air lift spring is mounted between the air spring lever and the hanger. The selectively controlled expansion and retraction of the air lift spring rotates the lower torque rod about its pivot connection to the hanger. The rotation of the torque rod selectively raises and lowers the axle seat relative to the vehicle chassis.

In the vehicle suspension system of the present invention, a pivot lever and an upper torque rod replace the piston and cylinder torque rods of prior art selfsteering suspension systems. The pivot lever and upper torque rod serve as a link in the parallelogram suspension system, and are also employed in adjusting the pitch of the vehicle axle supported by the axle seat.

The pivot lever is pivotally connected to the hanger above the pivot connection of the lower torque rod to the hanger. An automatically expanded and retracted piston and cylinder assembly is connected between the vehicle chassis and a second end of the pivot lever, opposite the end of the lever pivotally connected to the hanger. By alternate extension and retraction of the piston in the cylinder, the pivot lever will pivot around its connection to the hanger through an arc of predetermined length.

The upper torque rod is pivotally connected between the axle seat and the pivot lever. The torque rod is connected to the pivot lever at a point intermediate the levers' connections to the hanger and the piston and cylinder assembly. Together with the pivot lever, the upper torque rod completes the parallelogram linkage assembly between the axle seat and the hanger.

By alternately retracting the piston into the cylinder, and extending the piston from the cylinder, the pivot lever is pivoted in first and second directions about its pivot connection to the hanger, respectively. By pivoting the pivot lever in the first and second directions, the position of the upper torque rod relative to the parallelogram linkage is adjusted between a first and a second position, respectively. In the first position of the upper torque rod, the orientation of the axle seat is altered so that the pitch of the vehicle axle supported by the axle seat is set at a positive or forward pitch. In the second position of the upper torque rod, the orientation of the axle seat is altered so that the pitch of the vehicle axle supported by the axle seat is set at a negative or rearward pitch.

In a preferred embodiment, the cylinder of the piston and cylinder assembly has separate forward and reverse fluid ports that communicate with the interior of the cylinder on opposite sides of the piston. The piston is extended or retracted relative to the cylinder, depending on the direction of flow of hydraulic fluid through the ports. The direction of flow of hydraulic fluid through the forward and reverse fluid ports of the cylinder is automatically controlled in response to the vehicle transmission operation. When the vehicle transmission is operated in a forward drive ratio, the direction of flow of hydraulic fluid through the ports is controlled to retract the piston into the cylinder and pivot the pivot lever and the connected upper torque rod toward the axle seat. The axle seat is controlled by the movement of the pivot lever and the upper torque rod to swing around its connection with the lower torque rod to a forward caster or positive pitch position.

When the vehicle trasmission is operated in a reverse drive ratio, the direction of flow of hydraulic fluid through the ports is controlled to extend the piston from the cylinder. The extension of the piston pivots the pivot lever and the connected torque rod away from the axle seat. The pivoting movement of the pivot lever and upper torque rod controls the axle seat to swing around its connection with the lower torque rod to a rearward caster or negative pitch position.

The piston and cylinder assembly of each suspension system positioned on the opposite sides of the vehicle chassis is capable of adjusting the pitch orientation of the vehicle axle supported by the axle seats by itself, without assistance from the other piston and cylinder assembly.

Likewise, the airlift spring of each suspension system positioned on the opposite sides of the vehicle chassis is capable of lifting the axle seats and the supported vehicle axle relative to the vehicle chassis by itself, without assistance from the other lift spring. Should one of the piston and cylinder assemblies fail, or one of the airlift springs positioned on opposite sides of the vehicle chassis fail, the remaining operative piston and cylinder assembly or lift spring of the other suspension system will be capable of functioning on its own, so that the axle pitch may still be automatically adjusted, and the axle seat may be still be selectively raised and lowered relative to the vehicle chassis.

BRIEF DESCRIPTION OF THE DRAWINGS

Further objects and features of the present invention are revealed in the following detailed description of the preferred embodiment of the invention and in the drawing figures wherein:

FIG. 3 is a front elevation view taken along the line 3—3 in FIG. 1;

FIG. 4 is an elevation view in section taken along the line 4—4 of FIG. 1;

FIG. 5 is a side elevation view in section taken along the line 5—5 of FIG. 3 but with the suspension system raised.

DETAILED DESCRIPTION OF THE PREFERRED EMBODIMENT

Figure 2:
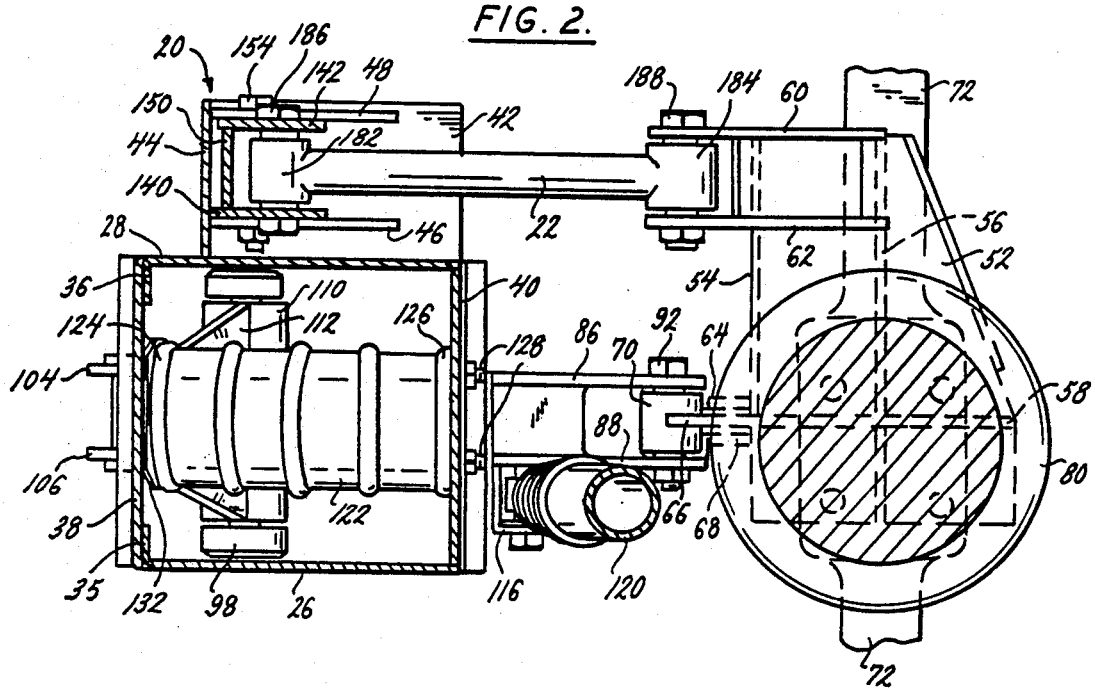
FIG. 2 is a top plan view in section of the suspension system of FIG. 1 taken along the line 2—2 in FIG. 1.
Figure 1:
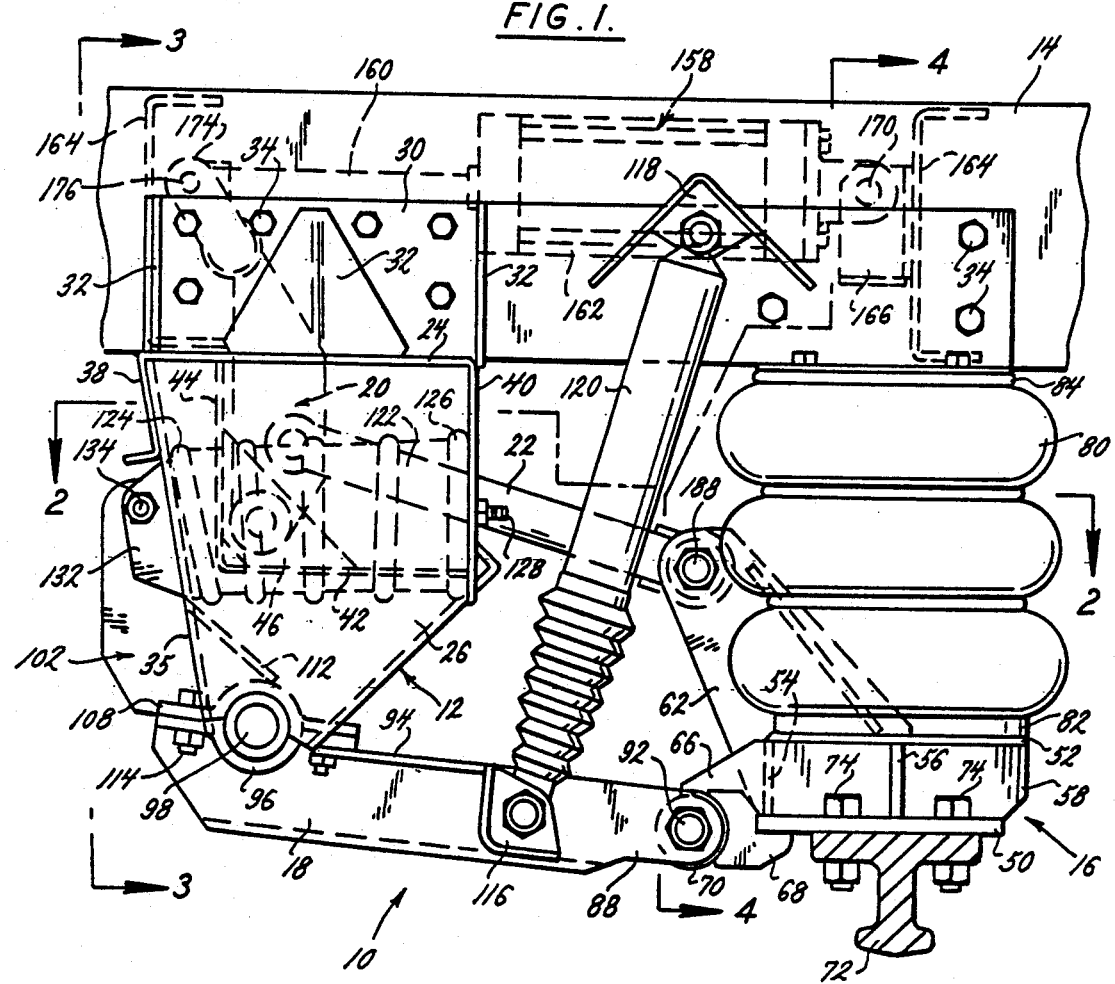
FIG. 1 is a side elevation view of the suspension system of the present invention.

The suspension system of the present invention is primarily employed in supporting a trailing or pusher axle of a vehicle. FIG. 1 of the drawings shows the elevating, reversible self-steering suspension system 10 of the present invention. The suspension system is generally comprised of a hanger assembly 12 secured to the underside of a vehicle chassis side rail member 14, an axle seat assembly 16, a lower torque rod 18 pivotally connected between the hanger assembly 12 and the axle seat assembly 16, a pivot lever 20 pivotally connected to the hanger assembly 12, and an upper torque rod 22 pivotally connected between the pivot lever 20 and the axle seat assembly 16.

It should be understood by those skilled in the art that the suspension described with reference to the drawing figures is only one-half of a complete suspension system, and that a suspension like that shown in the drawing figures is mounted to the vehicle chassis on the opposite side of the vehicle.

The hanger assembly 12 is constructed as a pair of enclosures, an air lift spring enclosure and a pivot lever enclosure. The air lift spring enclosure includes a top horizontal plate 24, and a pair of vertical side plates 26, 28 suspended from the top plate 24. The top plate 24 itself is secured to the side rail 14 of the vehicle chassis by a longitudinally extending vertical plate 30 that is secured to the top plate 24 by a plurality of web members 32 welded between the top plate 24 and the vertical plate 30. The vertical plate 30 may be secured to the chassis side rail 14 by welding the plate to the side rail, or by securing the plate to the side rail by threaded fasteners 34. The forward edges 34, 36 of both the exterior and interior vertical side plates 26, 28, respectively, are turned toward each other to provide additional structural strength to the air lift spring enclosure of the hanger assembly. An additional plate 38 is welded across the tops of the forward edges 34, 36 of the side plates 26, 28 to further strengthen the hanger assembly. A rear end wall plate 40 is secured between the rear edges of the side plates 26, 28 to complete the air lift spring enclosure of the hanger assembly. A conventional bushing assembly is connected between the bottom edges of the two side plates in a manner to be described.

The pivot lever enclosure of the hanger assembly is located on an inboard surface of the interior vertical side plate 26. The pivot lever enclosure includes a horizontal bottom plate 42 secured to the interior side plate 26, and a vertical front wall 44 secured to both the interior side plate 26 and a forward edge of the horizontal bottom plate 42. A pair of parallel web members 46, 48 are secured between the vertical front plate 44 and a top surface of the horizontal plate 42. The web members 46, 48 provide additional structural strength to the pivot lever enclosure, and are provided with coaxial holes for mounting of a bushing of a pivot lever in a manner to be described.

The axle seat assembly 16 is comprised of a bottom horizontal plate 50 and a parallel top horizontal plate 52. The bottom and top horizontal plates are secured together by a pair of laterally extending vertical spacer plates 54, 56 and a longitudinally extending vertical spacer plate 58. The pair of lateral spacer plates and the longitudinal spacer plate are welded between the bottom plate 50 and the top plate 52 and give structural strength to the axle seat assembly. The axle seat assembly includes a pair of upper torque rod brackets 60, 62. The upper brackets are secured to an inboard portion of the top horizontal plate 52 and the lateral spacer plate 54. The axle seat assembly also includes three bottom torque rod brackets 64, 66, 68. The bottom brackets are secured to an outboard portion of the lateral spacer plate 54 and the bottom horizontal plate 50 and hold a bushing sleeve 70 that is connected to the lower torque rod 18 in a manner to be explained. A vehicle axle 72 is secured to the underside of the bottom horizontal plate 50. The vehicle axle is secured to the bottom plate 50 by welding the axle to the plate, or by connecting the axle to the plate by threaded fasteners 74.

An air spring 80 is positioned between the axle seat assembly 16 and the chassis side rail 14. The air spring includes a bottom plate 82 that is secured to the horizontal top plate 52 of the axle seat assembly, and a top plate 84 that is secured to the lower edge of the longitudinal vertical plate 30. The connection of the air spring top plate 84 to the longitudinal plate 30 holds the air spring 80 in place beneath the chassis side rail 14.

The lower torque rod 18 has a substantially U-shaped configuration as best seen in FIG. 3. The rearward end of the torque rod is formed in the shape of a pair of spaced flanges 86, 88 with coaxial holes (not shown) extending through both the flanges. In assembling the lower torque rod 18 to the axle seat assembly 16, the spaced vertical flanges 86, 88 are positioned on opposite sides of a conventional bushing 90 mounted in the bushing sleeve 70 of the axle seat. The coaxial holes through the torque rod flanges are lined up with the center hole (not shown) through the bushing 90, and a threaded fastener 92 is inserted through the aligned holes to pivotally connect the rear end of the lower torque rod 18 to the axle seat assembly 16.

A top plate 94 is secured to the top of the forward end of the lower torque rod 18. The top plate 94 is substantially flat, except for a semi-circular depressed section 96 in the plate that extends laterally across the top plate. The semi-circular section 96 is dimensioned to fit around the external surface of a conventional bushing 98 that is attached laterally across the bottom of the hanger of the air lift spring enclosure, between the exterior and interior side plates 26, 28 of the hanger assembly.

An extension arm 102 is attached to the top plate 94 of the lower torque rod 18 over the bushing 98. The attachment of the extension arm 102 to the top plate 94 releasably secures the bushing 98 supported by the hanger assembly 12 between the extension arm 102 and the lower torque rod 18. The extension arm 102 is comprised of a pair of spaced vertical brackets 104, 106 that are attached at their bottoms to a connecting plate 108. The connecting plate 108 is substantially flat with a semi-circular depressed section 110 extending laterally across the plate. The semi-circular section 110 is also shaped to fit around the external surface of the bushing 98 secured to the axle seat assembly 16 when the extension arm 102 and the lower torque rod 18 are releasably secured together. A pair of web members 112 are connected between the spaced brackets 104, 106 and the semi-circular section 110 of the connecting plate to increase the structural strength of the extension arm 102. A plurality of threaded fasteners 114 connect the connecting plate 108 of the extension arm to the top plate 94 of the lower torque rod. With the bushing 98 of the hanger assembly positioned between the semi-circular sections 96, 110 of the connected torque rod and extension arm, the lower torque rod 18 and the connected extension arm 102 are pivotally connected to the hanger assembly 12.

The lower torque rod 18 also has a lower shock absorber bracket 116 connected to its outboard side. An upper shock absorber bracket 118 is connected to the longitudinal vertical plate 30 intermediate the plate's connection to the hanger assembly 12 and the air spring assembly 80. A conventional shock absorber 112 is pivotally connected between the lower and upper shock absorber brackets 116, 118.

Figure 6:
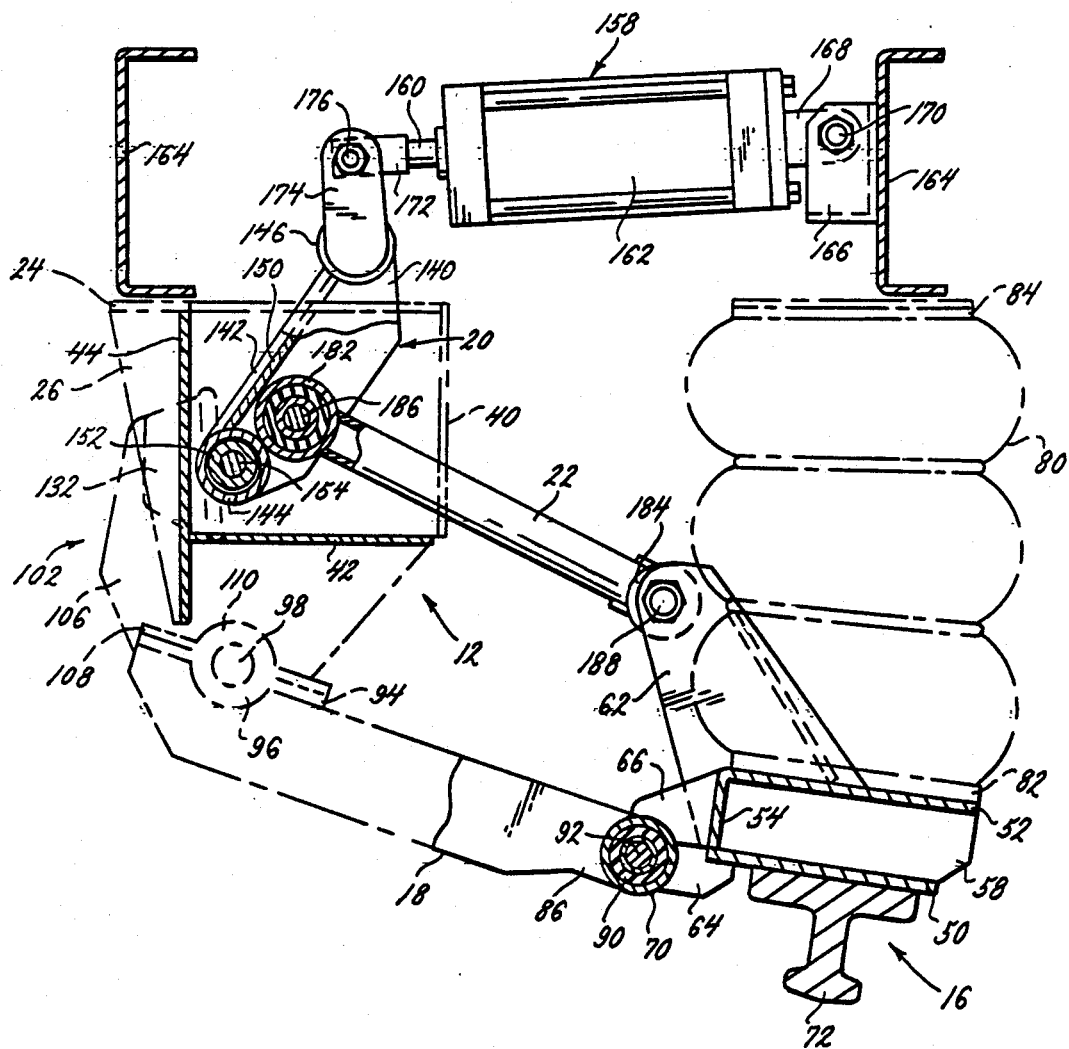
FIG. 6 is a side elevation view in section showing the suspension system lowered.

A selectively expanded and retracted air lift spring assembly 122 is postitioned between an upper portion of the extension arm 102 and the rear end wall plate 40 of the hanger assembly. The air lift spring assembly includes a front connecting plate 124 and a back connecting plate 126 at its opposite ends. The rear connecting plate 126 is secured to an interior surface of the hanger assembly rear end wall 40 by threaded fasteners 128. The front connecting plate 124 is secured to a reaction plate 132 that, in turn, is pivotally connected to the vertical brackets 104, 106 of the extension arm 102 by a threaded fastener 134. The front connecting plate 124 is connected to the reaction plate 132 of the extension arm 102 by threaded fasteners 136. The air lift spring 122 is in fluid communication with a selectively controlled source of fluid pressure (not shown) as is conventional. The direction of fluid flow to the air lift spring 122 from the source of fluid pressure is selectively controlled to supply fluid to, or drain fluid from, the air lift spring. From the position of the air lift spring assembly 122, the extension arm 102, and the lower torque rod 118, it should be clear that when fluid pressure is supplied to the air lift spring 122, the lower torque rod 18 will pivot about the bushing 98 in a clockwise direction as viewed in FIG. 5 and raise the axle seat assembly 16. Conversely, when fluid pressure is drained from the air lift spring assembly 122, the lower torque beam 18 will pivot clockwise about the bushing 98, and lower the axle seat assembly 16 relative to the vehicle chassis 14 as seen in FIG. 6. As the axle seat and the supported vehicle axle are raised and lowered relative to the vehicle chassis, the parallelogram linkage of the upper and lower torque rods serves to maintain the pitch of the supported axle substantially constant at its adjusted forward or rearward pitch.

The pivot lever 20 is connected to the pivot lever enclosure of the hanger assembly 12. The pivot lever includes a pair of spaced, parallel arms 140, 142 that are connected together at one end by a tubular bushing sleeve 144. The opposite ends of the pivot lever arms 140, 142 are connected by a transverse post 146. An additional bushing is mounted between the pivot lever arms 140, 142 intermediate the bushing sleeve 144 and the transverse post 146 in a manner to be described. The pivot lever arms are also connected by a connecting plate 150 that adds additional structural strength to the pivot lever 20. The pivot lever 20 is pivotally connected to the pivot lever enclosure of the hanger assembly by a conventional bushing 152 inserted in the lower bushing sleeve 144. A threaded fastener bolt 154 is inserted through coaxial holes (not shown) in the web members 46, 48 of the pivot lever enclosure, and through the center bore (not shown) of the bushing 152 inserted in the lower bushing sleeve 144. The bolt 154 is releasably secured in place by a nut. The bushing 152 mounting the pivot lever 20 to the web members 46, 48 of the hanger assembly 12 permits the pivot lever 20 to pivot about the threaded fastener 154 relative to the hanger assembly.

The pivoting of the pivot lever 20 relative to the hanger assembly 12 is controlled by a selectively extended and retracted piston and cylinder assembly 158. The piston and cylinder assembly 158 is conventional and includes a piston (not shown), a piston rod 160, and a cylinder housing 162. The cylinder housing 162 is pivotally connected to a cross beam member 164 of the vehicle chassis framework by a bracket 166 on the cross beam 164 and a flange 168 connected to the back of the cylinder housing 162. The flange 168 has a hole (not shown) through its end. A threaded fastener 170 is inserted through a pair of coaxial holes (not shown) in the bracket 166 and through the hole in the flange 168 and is secured in place by a nut. The threaded fastener 170 connecting the cylinder housing flange 168 to the chassis cross member bracket 166 permits the piston and cylinder assembly 158 to pivot about the threaded fastener 170 relative to the vehicle chassis. The piston rod 160 has a forked extension 172 at its distal end. The forks of the extension 172 are positioned on opposite sides of a connecting flange 174 that extends from an outboard end of the transverse post 146 of the pivot lever 20. A pair of coaxial holes (not shown) are provided through the spaced forks of the forked extension 172. The coaxial holes of the forks are lined up with a hole (not shown) through the connecting flange 174, and a threaded fastening bolt 176 is inserted through the aligned holes of the forked extension 172 and the connecting flange 174. The bolt is secured in place by a threaded nut to pivotally connect the piston rod 160 to the pivot lever 20.

It can be seen from FIGS. 1, 5 and 6 that when the piston rod 160 of the piston and cylinder assembly 158 is extended from the cylinder housing 162, the pivot lever 20 will pivot counterclockwise a predetermined arc length about the threaded fastener 154. Additionally, when the piston rod 160 is retracted into the cylinder housing 162 of the piston and cylinder assembly 158, the pivot lever 20 will pivot clockwise a predetermined arc length about the threaded fastener 154. The extension and retraction of the piston from and into the cylinder 162, respectively, is controlled by fluid pressure from a fluid pressure source of the vehicle (not shown). The fluid pressure is supplied to and drained from fluid pressure ports (not shown) in the cylinder housing 162. The fluid ports are positioned on opposite sides of the piston contained in the housing. By controlling the direction of fluid flow to and from the fluid pressure ports, the piston and piston rod 160 are extended from, or retracted into, the piston housing 162.

The upper torque rod 22 comprises a tubular rod 22 with bushing sleeves 182, 184 secured to its forward and rearward ends, respectively. The bushing sleeve 182 at the forward end of the upper torque rod 22 is pivotally connected to the pivot lever 20 by a bushing 186 mounted on the pivot lever. To assemble the forward end of the upper torque rod 22 to the pivot lever 20, the bushing 186 is first press-fit into the forward bushing sleeve 182. The bushing sleeve 182, together with the bushing 186, is then pivotally mounted to the pivot lever 20 by aligning the center hole (not shown) of the bushing 186 with a pair of coaxial holes (not shown) in the pivot lever arms 140, 142. A threaded fastening bolt 186 is then inserted through the coaxial holes in the pivot lever arms and through the center hole through the bushing 148. Releasably securing the threaded fastener 186 in place with a threaded nut pivotally connects the forward end of the upper torque rod 22 to the pivot lever 20. The bushing sleeve 184 at the rear of the upper torque rod 22 is connected to the upper torque rod brackets 60, 62 of the axle seat assembly 16 in the same manner. A conventional bushing is first inserted into the interior of the rear bushing sleeve 184, and the center hole (not shown) through the bushing assembly is aligned with a pair of coaxial holes (not shown) through the upper torque rod brackets 60, 62. A threaded fastener 188 is then inserted through the coaxial holes of the upper torque rod brackets and the center hole of the bushing, and is releasably secured in place with a threaded nut to pivotally connect the rear end of the upper torque rod 22 to the axle seat assembly 16.

From the above described structure of the selectively elevating, reversible self-steering suspension assembly, it can be seen that by selective extension and retraction of the air lift spring assembly 122, the lower torque beam 18 will pivot about the bushing 98 and either raise the axle seat assembly 16 relative to the vehicle chassis, or lower the axle seat assembly 16 relative to the vehicle chassis, respectively.

The air lift spring assembly 122 is designed to be communicated with a convenional source of pressurized fluid of a vehicle with which the suspension system of the invention is employed. It is intended that the direction of fluid flow to and from the air lift spring assembly 122 be selectively controlled by the vehicle operator. By selectively supplying pressurized fluid to the air lift spring assembly 122, and selectively draining pressurized fluid from the air lift spring assembly, the vehicle operator may selectively raise and lower the axle seat assembly 16 relative to the vehicle chassis 14 as desired.

The extendable and retractable piston and cylinder assembly 158 is also designed to be connected to a source of fluid pressure of a conventional vehicle. By controlling the supply of pressurized fluid to and from the cylinder housing 162 fluid ports (not shown), the piston rod 160 can be either extended from the cylinder housing 162, or retracted into the cylinder housing. By extending the piston rod 160 from the cylinder housing 162, the pivot lever 20 pivots counterclockwise about the pivot connection at the threaded fastener 154 as viewed in FIGS. 1, 5 and 6. By retracting the piston and piston rod 160 back into the cylinder housing 162, the pivot lever 20 pivots clockwise about the pivot connection at the fastener 154 as viewed in the drawing figures.

The upper torque beam 22 pivotally connecting the pivot lever 20 to the axle seat assembly 16 causes the axle seat assembly to adjust its orientation to a negative caster or reverse pitch in response to the counterclockwise pivoting of the pivot lever. When the piston rod 160 is controlled to retract back into the cylinder housing 162, the pivot lever 20 pivots clockwise about the threaded fastener 154 connecting the pivot lever to the hanger assembly 12. The upper torque rod 22 pivotally connected between the pivot lever 20 and the axle seat assembly 16 causes the axle seat assembly to adjust its orientation to a positive caster or forward pitch in response to the clockwise rotation of the pivot lever relative to the hanger assembly.

The supply of pressurized fluid to the fluid ports of the cylinder assembly 162 can be selectively controlled by the operator of the vehicle to adjust the pitch of the vehicle axle supported by the axle seat. In a preferred embodiment, the flow of pressurized fluid to and from the fluid ports of the cylinder housing 162 is automatically controlled in response to operation of the vehicle transmission. When the vehicle transmission is shifted to a forward gear ratio, flow of fluid is automatically controlled to retract the piston rod 160 into the cylinder housing 162 and set the vehicle axle 72 supported by the axle seat assembly 16 at a positive caster or forward pitch. When the vehicle transmission is shifted to a reverse drive ratio, the flow of fluid to and from the cylinder housing 162 is automatically controlled to extend the piston rod 160 from the cylinder housing 162 and adjust the orientation of the vehicle axle 72 supported by the axle seat assembly 16 to a negative caster or reverse pitch.

While the present invention has been described by reference to a specific embodiment, it should be understood that modifications and variations of the invention may be constructed without departing from the scope of the invention defined in the following claims.

What is claimed is:

1. An elevating, reversible, self-steering vehicle axle suspension assembly for a vehicle having a chassis and at least one axle, the assembly comprising:
   a hanger means adapted to be attached to a vehicle chassis;
   an axle seat means adapted to support a vehicle axle;
   a first linkage means pivotally connected to the axle seat means and the hanger means and arranged to selectively raise and lower the axle seat means relative to a vehicle chassis; and
   a second linkage means pivotally connected to the axle seat means and the hanger means and adapted to be pivotally connected to a vehicle chassis, the second linkage means being arranged to selectively adjust an orientation of a vehicle axle supported by the axle seat means between a forward caster and a rearward caster.

2. The suspension assembly of claim 1 comprising:
   the first linkage means including a first torque rod pivotally connected to the axle seat means and the hanger means; and
   the second linkage means including a pivot lever pivotally connected to the hanger means and adapted to be pivotally connected to a vehicle chassis, and a second torque rod pivotally connected to the pivot lever and the axle seat means.

3. The suspension assembly of claim 2 comprising:
   the second linkage means further including a selectively operated motor means connected to the pivot lever, the motor means being adapted to selectively pivot the pivot lever in a first and a second direction relative to the hanger means.

4. The suspension assembly of claim 3 comprising:
   the motor means being adapted to adjust an orientation of a vehicle axle supported by the axle seat means to a forward caster in response to the motor means pivoting the pivot lever in the first direction, and being adapted to adjust an orientation of a vehicle axle supported by the axle seat means to a rearward caster in response to the motor means pivoting the pivot lever in the second direction.

5. The suspension assembly of claim 3 comprising:
   the motor means being adapted to be connected to a vehicle chassis.

6. The suspension assembly of claim 3 comprising:
   the motor means being a piston and cylinder motor connected to the pivot lever and adapted to be connected to a vehicle chassis.

7. The suspension assembly of claim 1 comprising:
   the first linkage means including a first torque rod having first and second ends, the first end of the first torque rod being pivotally connected to the hanger means, and the second end of the first torque rod being pivotally connected to the axle seat means;
   the second linkage means including a pivot lever having a first and a second end, with the first end being pivotally connected to the hanger means, and including a second torque rod having first and second ends, the first end of the second torque rod being pivotally connected to the pivot lever, and the second end of the second torque rod being pivotally connected to the axle seat means.

8. The suspension assembly of claim 7 comprising:
   the second linkage means further including a selectively operated motor means connected to the second end of the pivot lever, the motor means being adapted to selectively pivot the pivot lever in a first and a second direction relative to the hanger means.

9. The suspension assembly of claim 8 comprising:
   the second linkage means causing an adjustment in an orientation of a vehicle axle supported by the axle seat means to a forward caster in response to the motor means pivoting the pivot lever in the first direction, and the second linkage means causing an adjustment in an orientation of a vehicle axle supported by the axle seat means to a rearward caster in response to the motor means pivoting the pivot lever in the second direction.

10. The suspension assembly of claim 1 comprising:
    the first linkage means and the second linkage means together forming a parallelogram suspension system between the axle seat means and the hanger means.

11. An elevating, reversible, self-steering axle suspension assembly for a vehicle having a chassis and an axle, the assembly comprising:
    a hanger means adapted to be connected to a vehicle chassis;
    an axle seat means adapted to support a vehicle axle;
    a first linkage member pivotally connected to the hanger means and adapted to be pivotally connected to a vehicle chassis;
    a second linkage member pivotally connected to the hanger means and the axle seat means; and
    a third linkage member pivotally connected to the first linkage member and the axle seat means.

12. The suspension system of claim 11 comprising:
    a first motor means connected to the second linkage member and the hanger means, and arranged to selectively raise and lower the axle seat means relative to the hanger means; and
    a second motor means connected to the first linkage member and adapted to be connected to a vehicle chassis, the second motor means being arranged to selectively adjust an orientation of a vehicle axle supported by the axle seat means between a forward caster and a rearward caster.

13. The suspension system of claim 12 comprising:
the first motor means being a selectively expanded and retracted air spring, and the second motor means being a selectively expanded and retracted piston and cylinder assembly.

14. The suspension system of claim 11 comprising:
the first linkage member, the second linkage member, and the third linkage member together forming a parallelogram suspension system between the hanger means and the axle seat means.

15. An elevating, reversible, self-steering axle assembly for a vehicle having a chassis and an axle, the assembly comprising:
 a hanger means adapted to be connected to a vehicle chassis;
 an axle seat means adapted to support a vehicle axle;
 a pivot lever means pivotally connected to the hanger means;
 a first torque rod means connected between the axle seat means and the hanger means;
 a first pivoting means connected to the first torque rod means and the hanger means to selectively pivot the first torque rod means in first and second directions relative to the hanger means and to responsively raise and lower the axle seat means, respectively;
 a second torque rod means connected between the axle seat means and the pivot lever means; and
 a second pivoting means connected to the pivot lever means and adapted to be connected to a vehicle chassis to selectively pivot the pivot lever means in first and second directions relative to the hanger means and to responsively adjust a pitch of a vehicle axle supported by the axle seat means between a rearward caster and a forward caster, respectively.

16. An elevating, reversible, self-steering vehicle axle suspension assembly for a vehicle having a chassis and at least one axle, the assembly comprising:
 a hanger means adapted to be attached to a vehicle chassis;
 an axle seat means adapted to support a vehicle axle;
 a first torque rod having first and second pivot connections, the first pivot connection connecting the first torque rod to the axle seat means and the second pivot connection connecting the first torque rod to the hanger means;
 a second torque rod having third and fourth pivot connections, the third pivot connection connecting the second torque rod to the axle seat means; and
 a pivot lever having fifth, sixth and seventh pivot connections, the fifth pivot connection connecting the pivot lever to the hanger means, the sixth pivot connection connecting the pivot lever to the second torque rod, and the seventh pivot connection being adapted to be connected to a vehicle chassis.

17. The suspension assembly of claim 16, wherein:
the sixth pivot connection of the pivot lever is connected to the fourth pivot connection of the second torque rod.

18. The suspension assembly of claim 17, wherein:
a selectively operated motor means is connected to the seventh pivot connection of the pivot lever, the motor means being adapted to selectively pivot the pivot lever in a first and a second direction relative to the hanger means.

19. The suspension assembly of claim 18, wherein:
the motor means being adapted to adjust an orientation of a vehicle axle supported by the axle seat means to a forward caster in response to the motor means pivoting the pivot lever in the first direction, and the motor means being adapted to adjust an orientation of a vehicle axle supported by the axle seat means to a rearward caster in response to the motor means pivoting the pivot lever in the second direction.

20. The suspension assembly of claim 18, wherein:
the motor means is a reciprocating piston and cylinder motor connected to the seventh pivot connection of the pivot lever and adapted to be connected to a vehicle chassis.

* * * * *